April 5, 1960     R. G. D. LAFFERTY     2,931,109

SYSTEM FOR CORRELATING AND EVALUATING DATA

Filed March 7, 1957     3 Sheets-Sheet 1

Inventor
R.G.D. Lafferty
by
Attorney

April 5, 1960 R. G. D. LAFFERTY 2,931,109
SYSTEM FOR CORRELATING AND EVALUATING DATA
Filed March 7, 1957 3 Sheets-Sheet 2

Inventor
R.G.D. Lafferty
by
Attorney

April 5, 1960    R. G. D. LAFFERTY    2,931,109
SYSTEM FOR CORRELATING AND EVALUATING DATA
Filed March 7, 1957    3 Sheets-Sheet 3
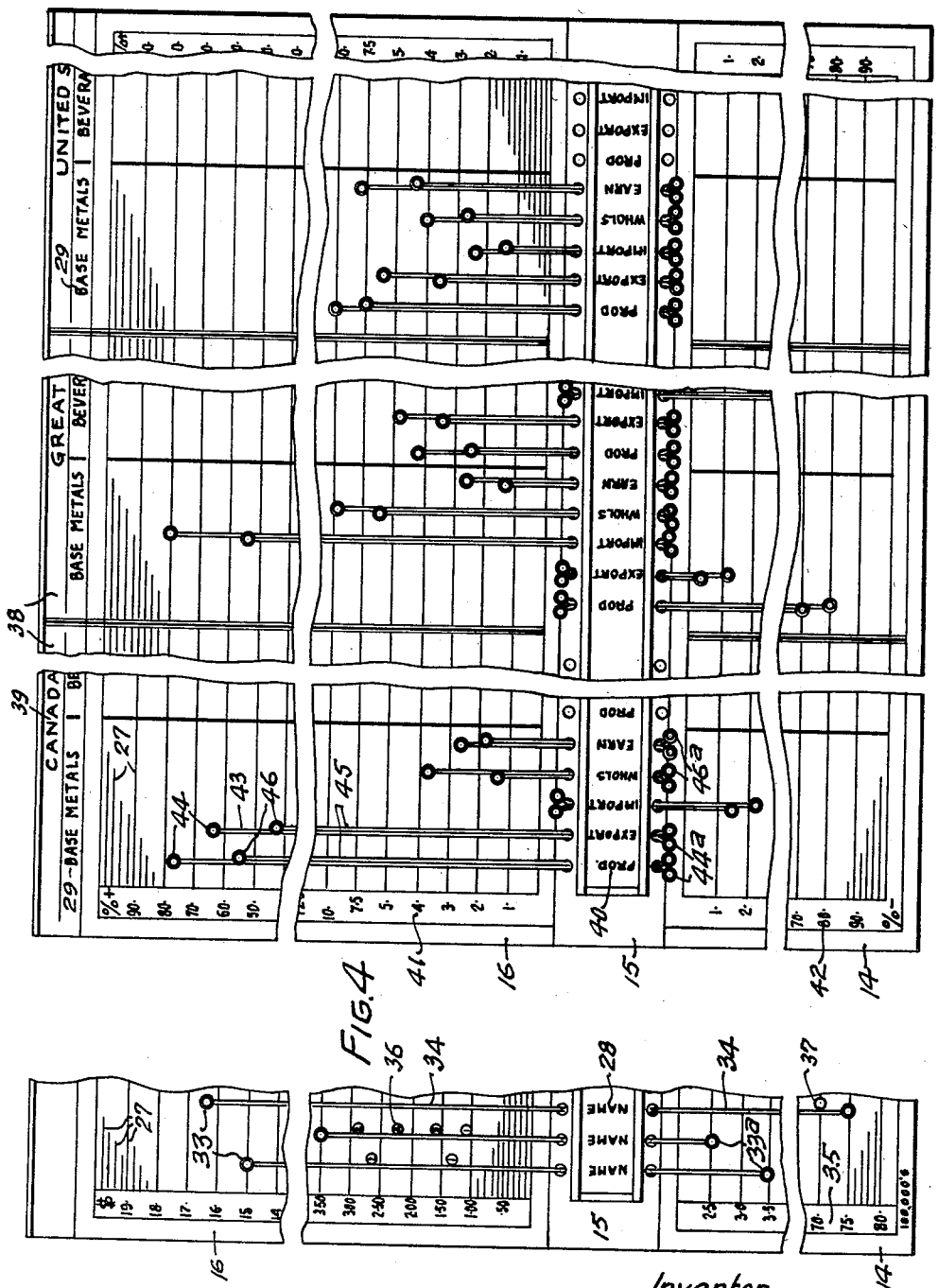
Inventor
R.G.D. Lafferty
by
Attorney United States Patent Office 2,931,109
Patented Apr. 5, 1960

2,931,109

SYSTEM FOR CORRELATING AND EVALUATING DATA

Richard G. D. Lafferty, Westmount, Quebec, Canada

Application March 7, 1957, Serial No. 644,498

9 Claims. (Cl. 35—24)

This invention relates to a system of correlating and evaluating data concerning the past and present actualities and future probabilities of a desired selection of a series of factors including cost, earnings, actual worth, supply and demand, labour, monetary, political and social conditions, popular trends and other factors capable of being statistically represented and directly and indirectly affecting a selected subject, or subjects, for the purpose of ascertaining the probable future value of the selected subject, or subjects, or of appraising their relationship to another set, or other sets, of subjects. A further object is to present correlated data in graphic form in such wise that it may be evaluated collectively, on sight and without necessity of making calculations, and by a group of persons at one time. Another object is to provide a system as aforesaid which may be kept up to date by non-technical operators who do not need to be trained chartists. Various other objects and the advantages of the invention may be ascertained from the following description and the accompanying drawings.

It is to be understood that the term "value" as herein used is not limited to monetary value, except where the context so requires, but extends to a numerical expression of any factor to be considered.

Broadly speaking, the invention consists in arranging indicia representing subjects for study and factors concerning the same in line, in groups, juxtaposed to quantitative scales extending in opposite directions transversely of the line of indicia, the indicia of each group representing subjects or factors of similar character, which are to be compared with one another, or compared as a group with other groups; and the scales representing values selected for purposes of comparison of the subjects; extending flexible, adjustable markers from each indicium over the scales to indicate comparable values for the subjects and factors; adjusting the aforesaid and complementary markers from time to time according to changes in the values indicated; and recording on the scales the changes of values over a period of time, in suchwise that the magnitude, sequence and direction of changes of values of the subjects and of factors which will influence the subject values may be visually compared by observing the positions of the markers on the scales.

In greater detail, the invention consists in the features and combinations of features herein disclosed, together with all such modifications thereof and substitutions of equivalents therefor as are within the scope of the appended claims.

For simplicity of explanation, the invention will be described hereinafter in relation to the correlation and evaluation of data concerning that type of subjects which are securities of the stock market but it will be understood that the invention is not thus limited but may be availed of for evaluation of a wide range of statistical data for other purposes, such as the correlation and evaluation of data concerning supply of and demand for or other factors concerning any type of natural or manufactured product as affected by geographical, weather, political, labour and other conditions, or the incidence and persistence of various sorts of social conditions as affected by geographical, seasonal, age, sex, occupational and other conditions.

In estimating the probable future value of any stock, either per se or in relation to the stocks of other companies in the same industry or in relation to the whole market or in establishing the probable future values of the stocks of an entire industry as compared to the whole market, great difficulty has been experienced in the past because of the necessity of making numerous calculations and the impossibility of assembling the results in suchwise as to produce a clear, readily understandable presentation. According to this invention, these difficulties are overcome by arranging the subjects for study, such as stocks, in groups according to class or industry, and economic or other factors which affect an industry or the whole stock market in other groups, in very compact form adjacent scales on which adjustable markers show the relations of the monetary and other factors which are to be considered, so that one may see at a glance the position of any stock in relation to others of the same group and the position of any stock or group of stocks in relation to other groups and to the whole market, and to conditions outside the market which may be expected to influence or determine future market values. For convenience of explanation, these assemblages of data and the means for visually presenting them are termed "charts" and are, in reality, living graphs in the sense that they are adjusted from time to time to show the direction, magnitude and sequence of changes of conditions over a period of time. For a presentation of all the factors that it may be desired to consider, it is preferred to make use of two, three, or more adjacent charts and to distinguish industries by applying a colour code to the markers, each industry having markers of the same colour in all charts. One such chart will show on a comparable basis the market prices, earnings and values of individual stocks while another will show the domestic economy frameworks of the industries and still another will show data of basic national and international conditions which may be expected to influence the domestic economy and, consequently, the future values of the stocks under study.

The form of apparatus now preferred in practising the invention, but to the details of which the invention is not limited, is illustrated in the accompanying drawings in which:

Fig. 3 is a fragmentary plan view of a unit for charting data in respect of non-dividend paying stocks.

Fig. 4 is a fragmentary plan view of a unit for charting data in respect of the economic frameworks of industries and other economic factors.

Figure 1:
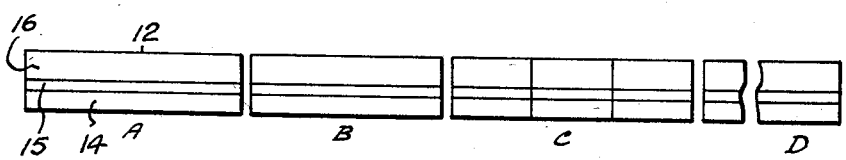
Fig. 1 is a diagrammatic representation of a system composed of a plurality of charting units.
Figure 6:
Fig. 6 is a plan view of one of the markers used in the unit of Fig. 2.
Figure 5:
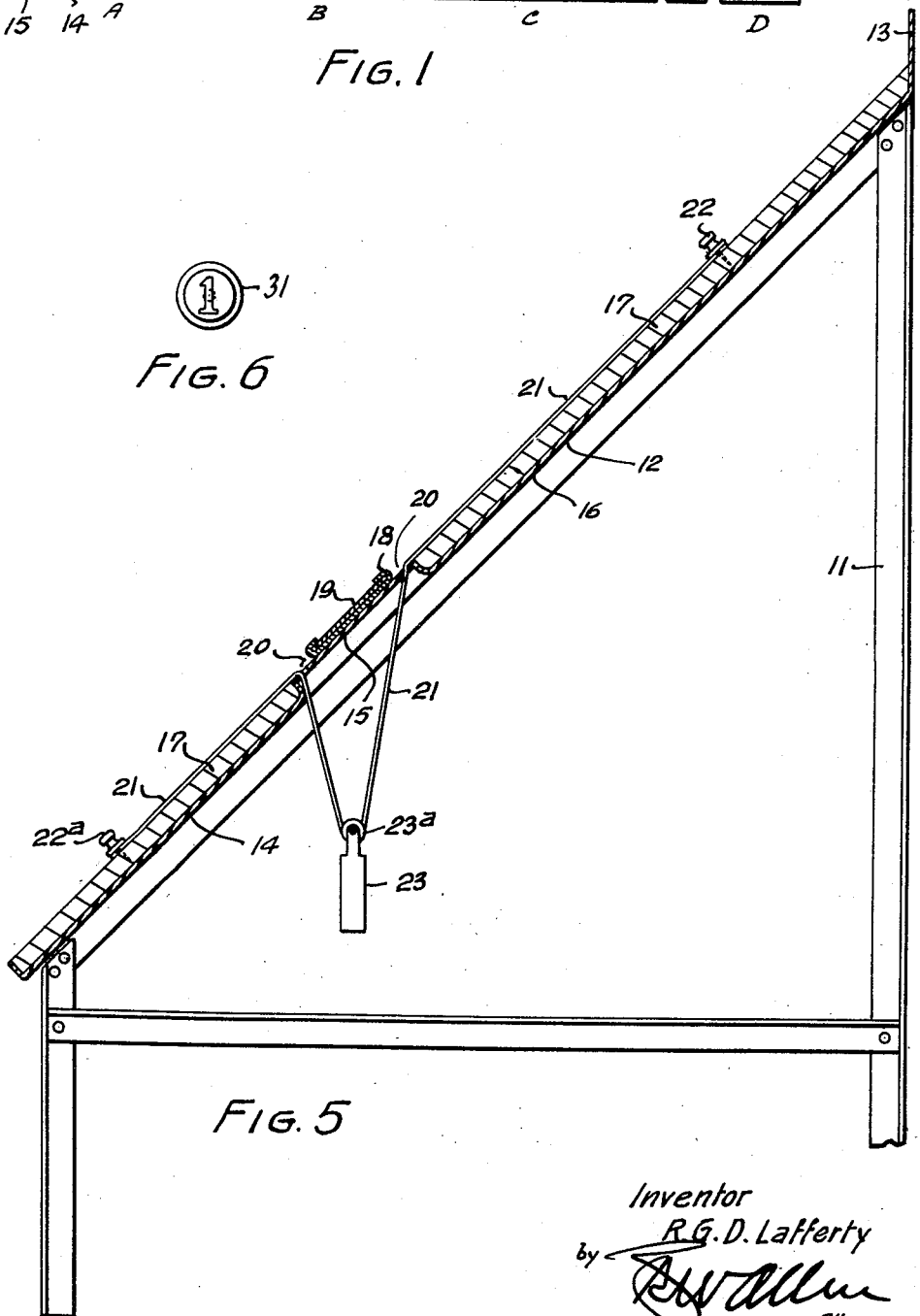
Fig. 5 is a cross-sectional view of the charting means of any of Figs. 2, 3 and 4, at a location such as indicated by the line 5—5 of Fig. 2.
Figure 2:
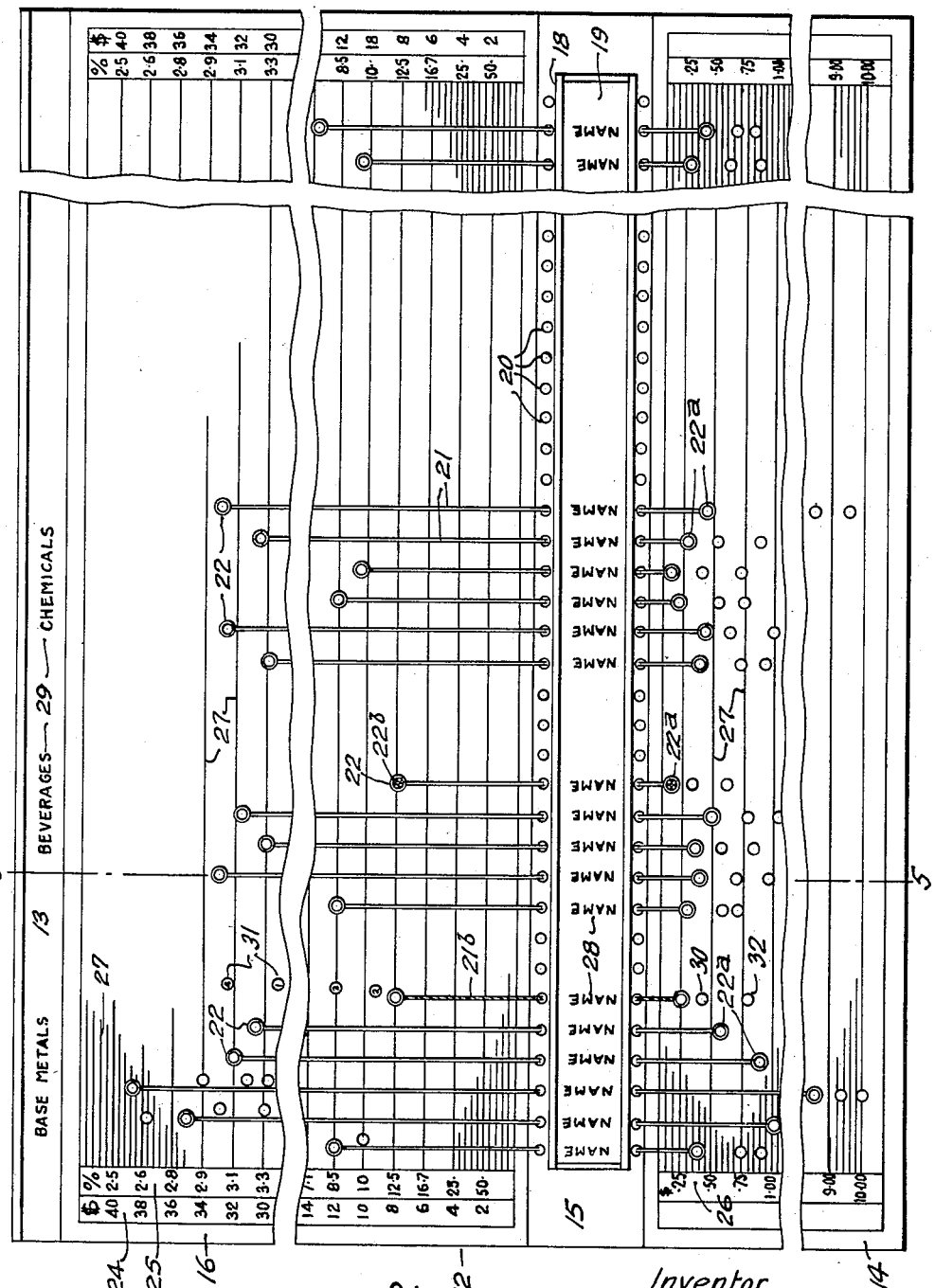
Fig. 2 is a fragmentary plan view of a charting unit for presenting data in respect of dividend paying stocks.

Referring more particularly to the drawings, A, B, C and D in Fig. 1 designate four structurally substantially similar charting units, of which unit A is shown in detail in Fig. 2, and units B and C in Figs. 3 and 4, respectively. Each unit is an elongated structure, the length of which is determined by the number of subjects to be charted thereon. In Figs. 2 to 5, the numeral 11 designates a framework supporting a substantially rigid table 12 at such elevation and inclination as will facilitate viewing the upper surface thereof. A substantially upright indicia panel 13 rises from the upper edge of the table and is coextensive with the length of the table. The table may be regarded as divided longitudinally into lower, intermediate and upper portions or panels 14, 15 and 16, respectively. The lower and the upper panels, 14 and 16, each include an upper surface portion 17 of material soft enough to permit pins to be inserted easily therein by finger pressure, such as soft wood, cork, rubber or any suitable composition. The intermediate panel 15 carries a holder 18, extending substantially from end to end of the panel, into which indicia-bearing cards or strips of paper, designated 19, may be inserted. The panel is formed with two rows of apertures 20, one above and one below the holder 18, the apertures of the two rows being aligned in the transverse direction of the panel. The apertures are relatively closely spaced in their rows, for example approximately one-half inch, centre to centre. A flexible member designated 21, which is most conveniently a cord and is hereinafter so termed, passes upwardly through each pair of aligned apertures and its end portions overlie the table above and below the panel 15. The extremities of each cord are armed with sharp pointed, headed markers 22 and 22ᵃ which may be readily inserted into the soft surface portions of the panels 14 and 16. The intermediate portion of each cord depends in a loop beneath the table. A tensioning means, such as a weight 23, sufficient to hold the cord in slight tension when the markers 22 and 22ᵃ are fixed to the table, is suspended from the loop of each cord, preferably by means of an eye or a small pulley 23ᵃ at the upper end of the weight, through which the cord passes.

The charting means shown in Fig. 2 is suitable for ascertaining the relative values of dividend paying stocks and the future probabilities thereof except as these may be influenced by external conditions. At the ends of the table and, if desired, at intermediate points, series of numerals, designated 24 and 25, are imprinted on the upper panel 16 and a series of numerals, designated 26, on the lower panel 14, the numerals of each of these series being in regular progression reading away from the intermediate panel 15. The numerals 24 indicate the prices of stocks in terms of monetary units per similar monetary unit of dividend, for example in dollars per dollar of dividend, and the numerals 25 indicate the percentage yield for each price. The numerals 26 indicate, in the same monetary unit, the amounts of earnings per share of stock and the amount of depreciation and depletion written off per share of stock, adjusted to the same ratio used to express the price in terms of monetary units per monetary unit of dividend. A series of lines 27 running lengthwise of the table from the numerals 24, 25 and 26 are imprinted on the panels 14 and 16 or on sheets of paper secured to the panels and are graduations, extending from end to end of the table, of scales reading away from the intermediate panel 15. The cards or strips of paper 19 mounted in the holder 18 of the intermediate panel are imprinted with indicia 28 representing the various stocks, these indicia being in register between the upper and lower apertures 20. The arrangement of the indicia corresponds to a grouping of the stocks according to industries. For example, the indicia for the stocks of all companies producing base metals are grouped together while those for the stocks of all companies producing beverages are grouped together, and so on. The industry groups are identified by indicia 29 on the indicia panel 13 above the several groups. The industry groups are further identified and distinguished by making the cords 21 in each group a different colour or colour combination from those in any other group.

In using the apparatus just described, the market price of each stock at a predetermined date is adjusted to reflect the market capital cost per monetary unit of annual dividend, based on an estimate of the indicated dividend for the current fiscal year and the upper marker 22 for each stock is thrust into the soft surface of the panel 16 directly above the indicium for that stock and at a point, as determined by the scale graduation lines 27, which corresponds to the adjusted price of the stock. The markers 22ᵃ are set in the lower panel 14 according to the scale graduations to show the earnings per share of stock on a basis comparable with the capital costs shown on the upper panel, that is, the last published earnings during a predetermined period, usually the last fiscal year, divided by the indicated dividend of the current year and adjusted to the same monetary unit per dividend as used to express prices. When the markers 22 and 22ᵃ are fixed in the table, the cords 21 extend from them to the line of indicia on the panel 15 so that one may see at a glance the relations between prices, earnings and dividends for each stock, also the relation of one stock to another and to the whole industry. Markers 30 are placed on the lower panel below the markers 22ᵃ to indicate the price-depreciation ratios of the several stocks. By comparing the indications of the markers 22ᵃ and 30 on the lower panel 14 with the indications of the markers 22 on the upper panel 16, one may see at a glance whether or not the price-dividend ratios are justified by the financial positions indicated by the markers 22ᵃ and 30.

The markers 22, 22ᵃ and 30 are set to show conditions at a predetermined date, such as the commencement of a fiscal year or a calendar year, and the markers 22 may be moved periodically, for example weekly, while the markers 22ᵃ and 30 normally remain unchanged for six or twelve months. Changes of conditions during such periods are indicated by inserting additional markers 31 and 32 along the lines of the cords 21. The markers 31, which are set in the upper panel 16, indicate changes in the price-dividend ratios of the stocks at predetermined intervals of time, for example annually. These markers are provided with indicia such as distinctive colours, numerals or letters in order that the sequence of the changes may be indicated, and their direction and magnitude learned. Thus, one may perceive at a glance the direction of change, both in the immediate past and over a long term, in the price-dividend ratio of each stock and the relation of these changes to changes in the similar ratios of other stocks, also the trend of change in a group of stocks and the relation of the trend to trends of change in other groups of stocks. The markers 32 are set in the lower panel 14, below the lines of the cords and serve to indicate changes in the price-earnings ratios of the stocks. The combination of the cords and the markers 22 and 22ᵃ with the further markers 30, 31 and 32 affords what is virtually a living graph of the whole market over period of time and enables one to readily detect a stock which is anticipating or is lagging behind the general trend of its group; or a group which is anticipating or is lagging behind the whole market, and thus be able to predict the probable direction of price change. If a change in the price-dividend ratio of any stock is noted and is not due to some specific, known cause, such as alteration in the amount of dividend, the reason may be found in the financial position exhibited on the lower panel 14, which in conjunction with the showing of charting unit C (Fig. 4), and perhaps of unit D, will indicate the probable long term direction of change, as will be explained hereinafter.

While the chart, unit A, is intended to show primarily facts relative to dividend paying stocks of the domestic market, there may be included in it the stocks of companies which have temporarily suspended payment of dividends or which are accumulating earnings as reserve instead of paying dividends; also stocks of foreign companies which are extensively traded in the domestic market. Such non-dividend paying stocks are indicated, as shown at 22ᵇ in Fig. 2, by a distinctive colouration of the markers 22 and 22ᵃ, which are positioned to show actual market prices and actual earnings, etc., per share.

The foreign stocks are indicated and distinguished by a colour of the cords 21 different from that of the domestic stocks, which colour is preferably uniform throughout all industry groups.

Unit B, shown in Fig. 3, is, except for the scale numerals, the same as unit A already described. This unit serves to show the positions of stocks of companies which have not developed sufficiently to pay dividends but are nevertheless good investment prospects or extensively traded. The markers 33 and 33ª on cords 34 are similar to the markers 22 and 22ª and the cords 21, already described. The markers 33 are set in the upper panel 16 to indicate on the scale the actual market prices of the stocks at the commencement of an observation period. The scale numerals 35 on the lower panel 14 indicate amounts in units of thousands or more. The lower markers 33ª serve to indicate on the lower scale the common stock capitalizations of the companies. Markers 36 are set in the upper panel to indicate, on the scale, price fluctuations. These markers are similar to the markers 31, already described. Further markers, designated 37, are set on the lower panel 14 and serve to indicate on the lower scale the amount of funded debt of each company. The colours of the cords 34 are the same as those of the cords 21 and for the same purpose.

Unit C, shown in Fig. 4, is structurally the same as unit A but is used to correlate, for each industry, data on a broader basis than in units A and B, namely, data such as production volumes, export and import volumes, wholesale price indices, average hourly earnings, accumulated inventories and statistics of monetary and other economic factors which affect industries as a whole. The charting effected by this unit may be divided into sections 38 on a geographical basis which is indicated by the indicia 39 on the panel 13, for example into three sections, one each for Canada, Great Britain and the United States. Indicia 40 on each section of the intermediate panel 15 indicate the above mentioned and any other conditions which it is desired to take into consideration and which affect industries as a whole. The numerals 41 and 42 of the upper and the lower scales, respectively, represent percentage changes. For each indicium 40 there is a cord 43 armed with markers 44 and 44ª, all similar to the cords 21 and markers 22 and 22ª. The cords 43 are preferably of the same colours as the cords of units A and B so that each industry is identified in all units by a single colour or colour combination of the cords. A second cord 45, of colour distinctive from all other cords, for example black, parallels each of the cords 43 and may run through the same apertures as the cords 43 and are tensioned in the same manner as the cords 21. These cords 45 are armed at their ends with markers 46 and 46ª similar to the markers 22 and 22ª. The coloured cords 43 and their markers 44 and 44ª are adjusted to the scales to indicate the current position of each of the factors indicated by the indicia 40, the upper markers 44 serving to indicate on the upper scale percentage increases over the previous year and the lower markers 44ª serving to indicate on the lower scale percentage decreases from the previous year. The cords 45 and their markers 46 and 46ª are adjusted on the scales to indicate the positions of the factors cumulatively for the year previous to the current positions indicated by the cords 43 and markers 44 and 44ª, percentage increases being indicated on the upper scale and percentage decreases on the lower scale. Thus, when the markers 44 and 46 are in use indicating increases, the markers 44ª and 46ª are idle and off the scale 42, as shown in Fig. 4, and vice versa. It will be understood that each section of this unit is subdivided according to industries and that each subdivision includes the indicia of all factors to be considered.

By observing the conditions and trends indicated by unit C and applying them to the indications of units A and B, one may forecast the effect of economic conditions, either in the domestic or the foreign economy, or both, on the future performance of any stock or group of stocks or on the market as a whole.

Unit D is structurally the same as units A and B and the charting effected is, in principle, identical with that of unit C, wherefore Fig. 4 may be regarded as illustrating unit D, the only difference from unit C being in the actual indicia on the board 13 and on the intermediate panel 15. This unit presents, on bases broader than in unit C, facts of the economies of major trading nations. The chart of unit D is, similarly to that of unit C, divided primarily into national sections and these, in turn, are divided into subsections for production, monetary activity, employment and any other factors that it may be desired to consider in connection with each industry, in the same way as the national sections of unit C are divided according to industries. The indicia on the intermediate panel 15 will represent, in each subsection, the various factors to be considered. Scales, cords and markers similar to those of Fig. 4 will indicate on the upper and lower panels values for the various factors, increases being shown on the upper panel and decreases on the lower panel. Supplementary markers, similar to the markers 30, 31, 32 of unit A, Fig. 2, may be used to indicate changes over a period of time.

By scanning unit D one may see at a glance and on a broad basis the economic situation, both internationally and nationally, and be able to estimate the probable effect thereof on the more specifically based showing of unit C and the probable ultimate modifying effect on the indications of units A and B as to the whole market or as to any industrial group or particular stock. Thus, although the financial position and prospects of a stock may be inherently favourable, as shown by unit A or B, the condition of the industry concerned or of the domestic economy, as shown by chart C, may indicate a probable future decline. Even if Chart C does not indicate a probable decline because of the domestic situation, or indicates an improvement, the chart of unit D may show conditions in other countries likely to have adverse effect on the domestic economy as a whole or on a particular industry.

Having thus described my invention, I claim;

1. A system of cumulatively charting current facts in relation to similar facts which occurred during an extended period of past time and estimating future probabilities concerning a series of subjects, which system comprises arranging indicia indicating the subjects and the economic factors which predicate the future probabilities of the subjects in groups, in line, between quantitative scales reading in direct progression away from the line of indicia; extending markers from the line of indicia over said scales to points on the scales indicating a plurality of values for each of the subjects and for the factors to be considered, which values have been adjusted to comparability, whereby all the charted values of the subject facts and of the factors are graphically indicated and readily and collectively visually discernible in true relation; adjusting said markers from time to time according to current values of the facts and factors; placing further markers along the lines of certain of the first said markers to indicate on the scales the direction, magnitude and sequence of previous adjustments of the first said markers whereby the extent and direction of changes in the values of the subjects and of the factors during a period of time are graphically and collectively visually discernible.

2. A system of cumulatively correlating and evaluating data for an extended period of time concerning the current and the former values of selected subjects and of economic factors and any other pertinent factors liable to influence the values, which system comprises assembling in groups and in line between quantitative scales, insignia representing the subjects to be examined and economic factors to be considered, the several subject indicia groups each comprising indicia representing subjects of generally similar character; extending markers from the indicia over said scales to points on scales indicating values for the subjects, which values have been adjusted to comparability thereby to graphically and collectively indicate true relative values for the subjects and factors; adjusting said markers periodically according to changes in the values; placing further markers on certain of said scales to record a succession of adjustments of the first said markers; said second markers having thereon indicia indicating the sequence of the adjustments of the first said markers, whereby the extent and direction of the adjustments of a plurality of said first markers and the individual and the relative changes of subject values indicated thereby over a period of time may be observed collectively and in comparison with changes in the economic factor values.

3. A system of forecasting the probable future actual worth and return on investment of a security or group of securities traded in a stock market by cumulatively recording current values and past values of the stocks over an extended period of time, which system comprises arranging indicia representing stocks in groups according to industries and in line between quantitative scales reading in direct progression away from the line of indicia; extending markers from the indicia over one of the scales to points thereon indicating the costs of the stocks per monetary unit of dividend; extending other markers from the indicia over the other of said scales to points thereon indicating the earnings per share of stock in relation to the cost thereof; periodically adjusting the first said markers according to changes in the cost-dividend ratios of the stocks; placing further markers along the lines of the first said markers to record the adjustments thereof, said further markers having sequence-indicating indicia thereon whereby the sequences, magnitudes and directions of adjustments of the first said markers are recorded; placing still further markers in the lines of said other markers to indicate on the other scale the price-depreciation ratios and the price-earnings ratios of the stocks; whereby the performance of a number of stocks is graphically shown and may be viewed collectively and the performance of any one or of any group relatively to others be observed.

4. A system according to claim 3 including the further features of arranging indicia representing economic and other statistical factors affecting industries in groups, in line, between quantitative scales; extending markers from said last mentioned indicia over the adjacent scales to indicate on one of said scales the current positions of each factor and the percentage increases in the factors and on the other of said scales percentage decreases in the factors.

5. A system according to claim 4 in which the indicia representing economic factors are grouped primarily according to the economies of a plurality of countries or geographical regions, each such group including indicia of factors affecting industry.

6. Means for correlating and evaluating data, which means includes a plurality of charting surfaces each divided into three parallel panels; a plurality of indicia means mounted on the intermediate of said panels indicating subjects to be considered; numerical scales formed on the outer of said panels; said intermediate panel being formed with a row of apertures adjacent each outer panel presenting pairs of apertures for each indicium; flexible marker members overlying said outer panels, passing through said apertures and arranged in loops; means at both of the ends of each said flexible members attachable to said outer panels to indicate on the scales values for the subjects represented by the indicia; and tensioning means in the loops of said flexible members.

7. Means for correlating and evaluating data which means includes an inclined charting surface divided transversely into lower, intermediate and upper panels; numerical scales on said lower and upper panels reading away from the intermediate panel and having the graduations thereof extending from end to end of the panels; said intermediate panel having apertures disposed in lower and upper rows adjacent the lower and upper panels; indicia means on said intermediate panel between the rows of apertures indicating subjects to be considered, each said indicium being aligned with a lower and an upper aperture; flexible members each extending through a lower and an upper aperture having their end portions overlying the lower and upper panels and their intermediate portions depending in loops beneath the intermediate panel; a marker attached to each end of each flexible member and capable of holding engagement in said lower and upper panels to indicate on the scales values for the subjects; and tensioning means engaged in the loop of each flexible member.

8. Means according to claim 7 in which the indicia of the intermediate panel are arranged in groups according to the general nature of the subjects represented thereby; the flexible members pertaining to each indicia group being all of the same colour or colour combination and different from the colour or colour combination of the flexible members of all other indicia groups.

9. Means for correlating and evaluating data which means includes a series of charting surfaces according to claim 6 in which the indicia of one charting surface represents specific subjects such as stocks, while the indicia of another charting surface represents domestic economic factors which affect the industries to which the subjects of the first said charting surface pertain, and the indicia of a third charting surface represent foreign economic factors which affect the domestic economy.

References Cited in the file of this patent

UNITED STATES PATENTS

| | | |
|---|---|---|
| 1,268,613 | Radebaugh | June 4, 1918 |
| 1,417,928 | Lord | May 30, 1922 |
| 1,700,318 | Karsten | Jan. 29, 1929 |
| 1,859,750 | Pratt | May 24, 1932 |
| 2,243,209 | Hutchison | May 27, 1941 |
| 2,412,238 | Wassell | Dec. 10, 1946 |
| 2,589,812 | Hoskins | Mar. 18, 1952 |